J. A. HEANY.
ELECTRIC WELDING MACHINE.
APPLICATION FILED NOV. 14, 1912.

1,061,378.

Patented May 13, 1913.
4 SHEETS—SHEET 3.

Witnesses
Edwin L. Bradford
Vernon J. Houghton

Inventor
John A. Heany
By Henry Goldsborough Neill
Attorneys

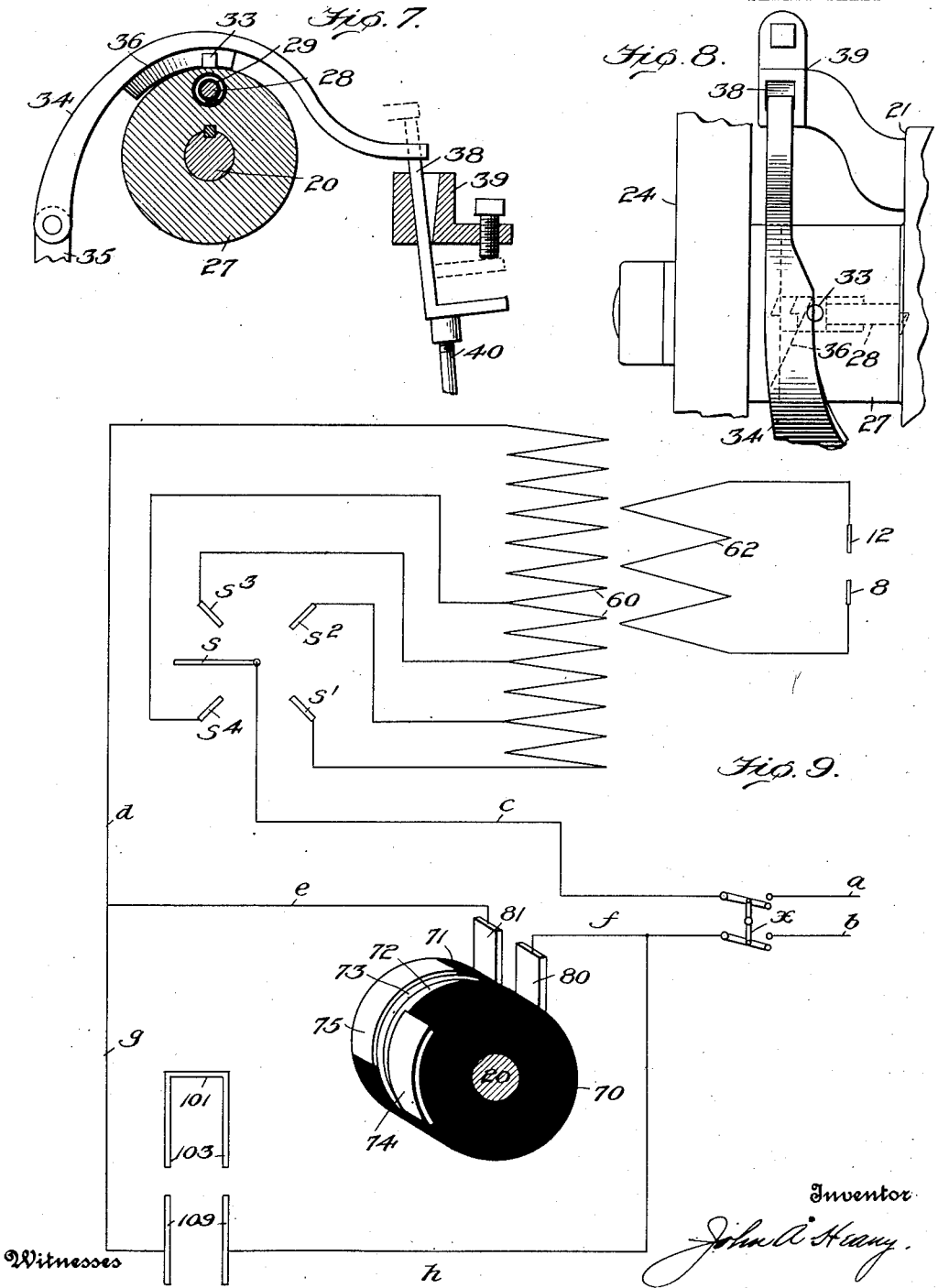

UNITED STATES PATENT OFFICE.

JOHN ALLEN HEANY, OF WASHINGTON, DISTRICT OF COLUMBIA.

ELECTRIC WELDING-MACHINE.

1,061,378.     Specification of Letters Patent.     Patented May 13, 1913.

Application filed November 14, 1912. Serial No. 731,306.

*To all whom it may concern:*

Be it known that I, JOHN ALLEN HEANY, a citizen of the United States, residing in the city of Washington, in the District of Columbia, have invented certain new and useful Improvements in Electric Welding-Machines; and I do hereby declare the following to be a full, clear, and exact description of the invention, such as will enable others skilled in the art to which it appertains to make and use the same.

This invention relates to electric welding machines, more particularly to the spot-weld type, so constructed and arranged that the successive welding operations, including bringing the electrodes into welding position with respect to the work and the application of the current to the electrodes for an accurately timed period just sufficient to effect a complete homogeneous weld, are automatically effected so that regular, uniform, homogeneous welds between the parts of the work operated upon are produced automatically by the machine, thereby leaving no element of the operation of the apparatus to the judgment or discretion of the operator, with the possible exception of the shifting of the work to properly space the welds, so that the formation of imperfect welds, burning of the work and injury to the machine by a careless operator are practically obviated.

The invention is illustrated in the accompanying drawings, in which—

Figure 1:
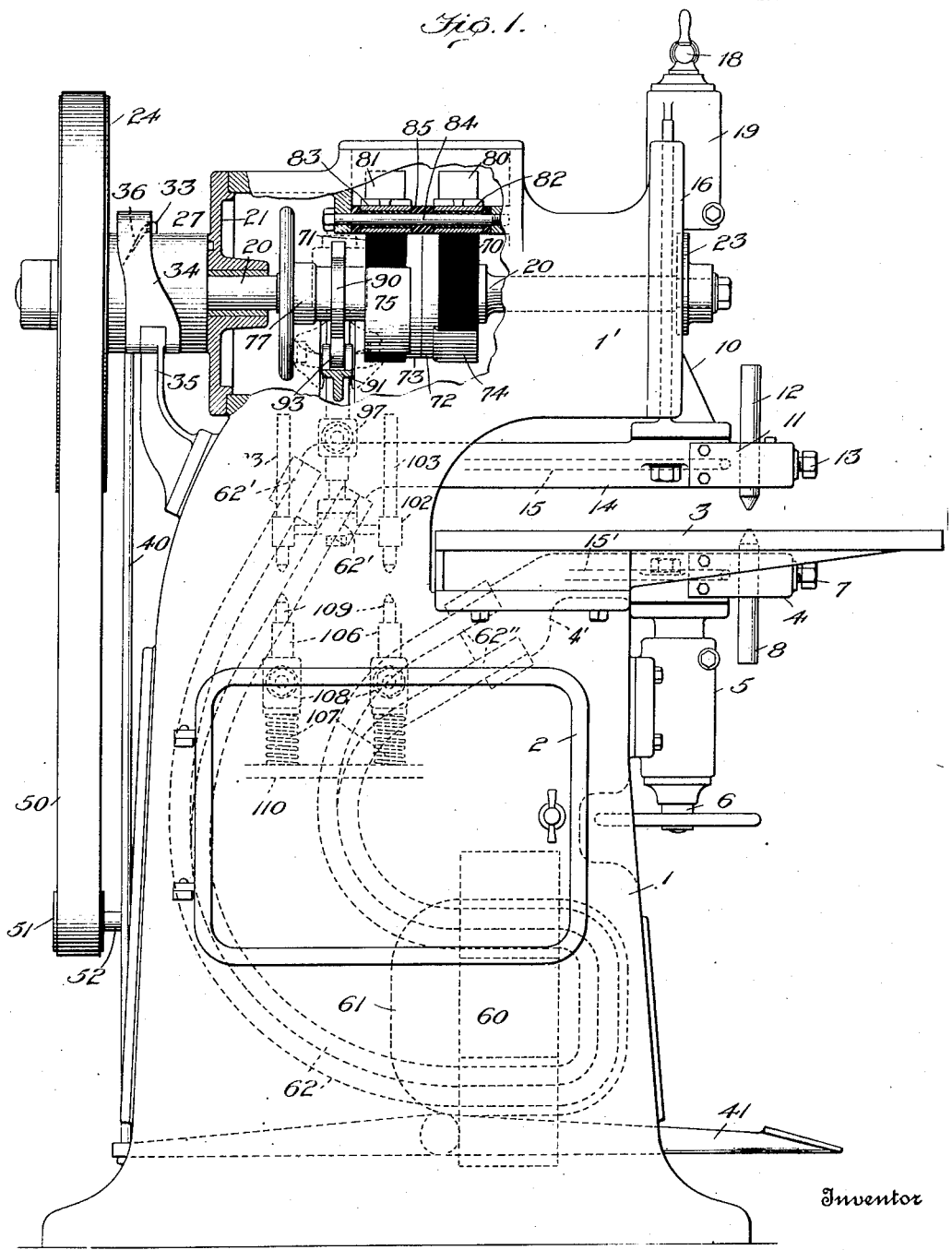
Figure 2:
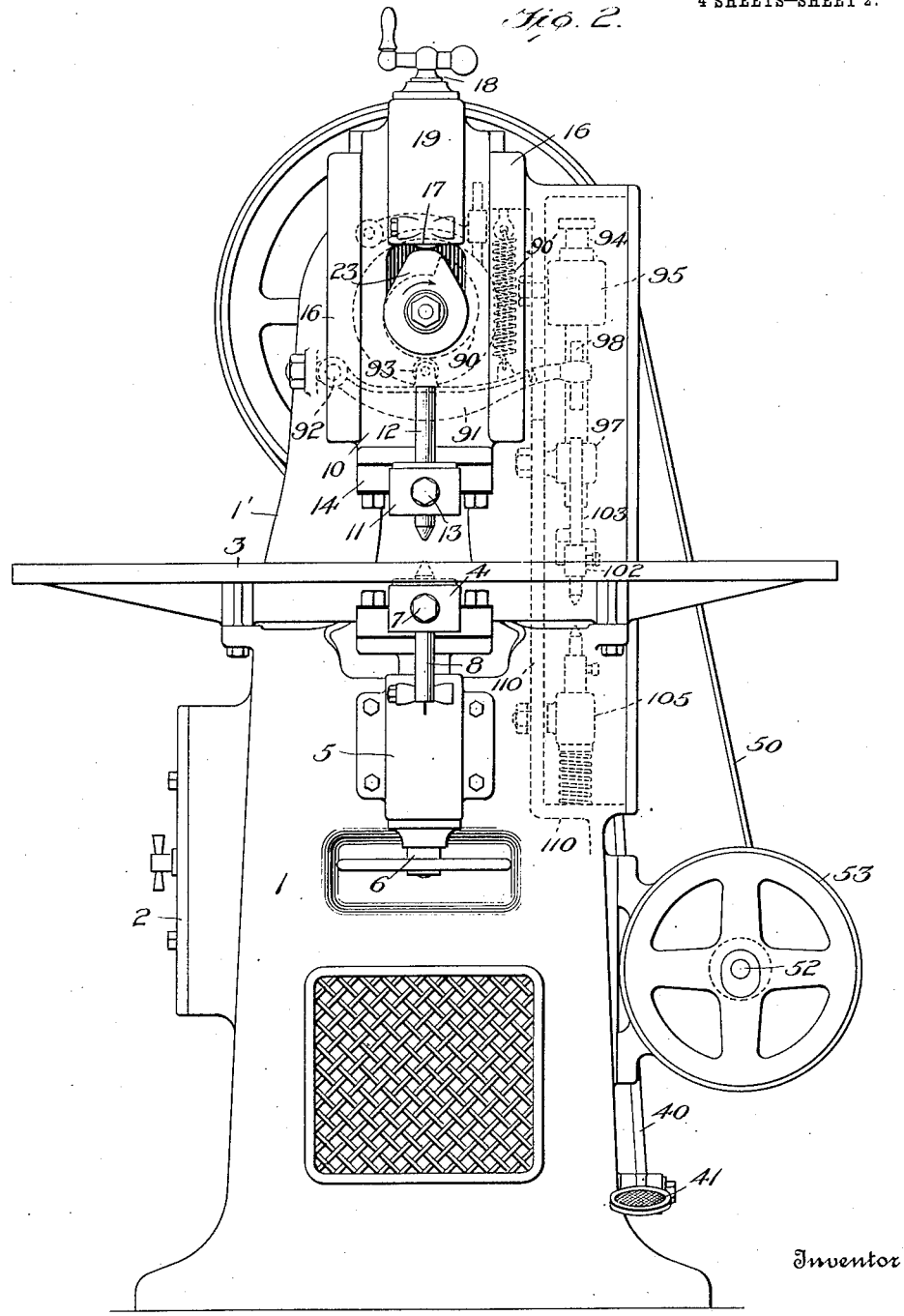
Figure 3:
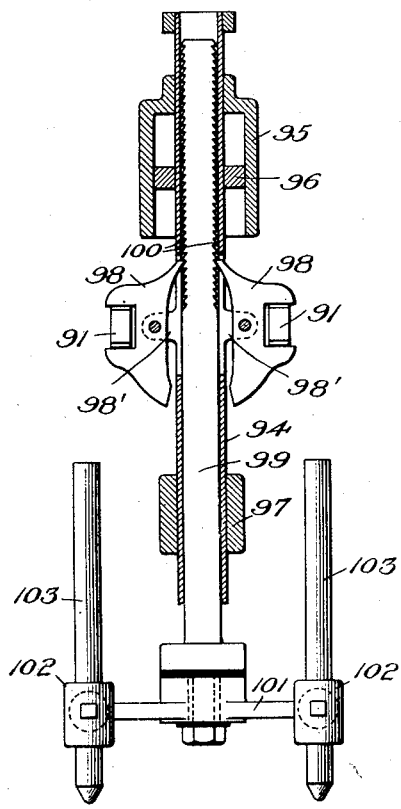
Figure 4:
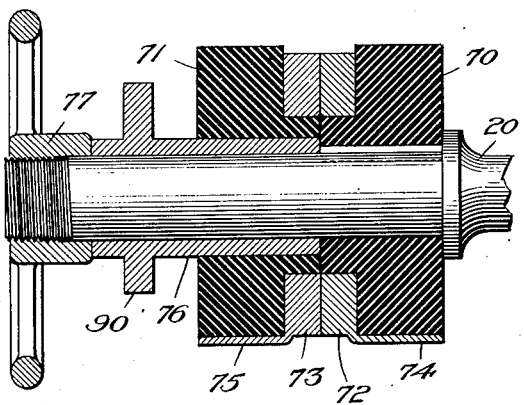
Figure 5:
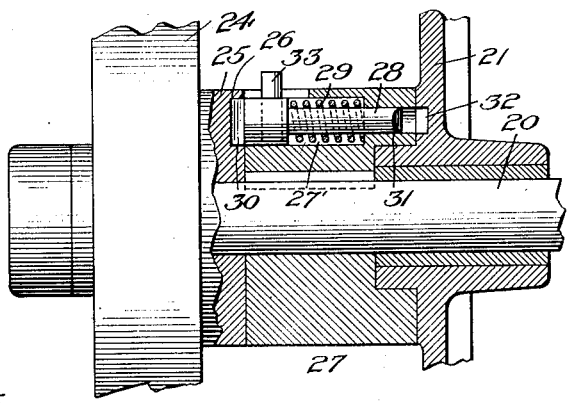
Figure 6:
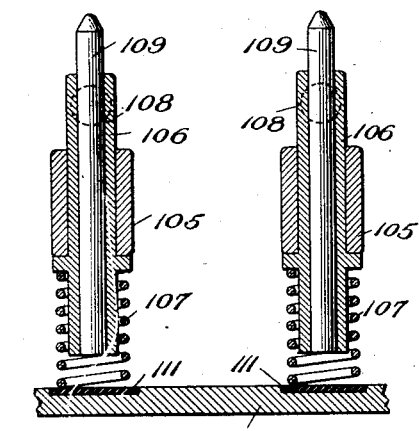

Figure 1 is a vertical side elevation of a complete organized machine involving the invention with parts thereof shown in section; Fig. 2 is a front elevation of the machine; Fig. 3 is a vertical elevation, partly in section, of the mechanism for shunting the current through an auxiliary break to prevent sparking between the contacts of the timing device; Fig. 4 is a horizontal section through the rotary member of the timing device; Fig. 5 is a detail view, partly in section, of the automatic clutching apparatus; Fig. 6 is a sectional plan view of the clutch; Fig. 7 is a transverse view, partly in section, of the clutch and its operating means; Fig. 8 is a plan view thereof; Fig. 9 is a diagrammatic view of the electrical circuits and appurtenant mechanism by means of which the welding is effected.

Referring to the drawings, 1 indicates a hollow standard or base having an overhanging head portion 1', said base being provided with a hinged door 2 on one side to permit access to the interior thereof. Mounted upon the base 1, lying below the head 1' thereof, is a table 3, below which is secured an insulated clamp 4 for the lower electrode 8 locked in said clamp by a suitable set screw 7. The said clamp 4 is connected to the upper end of adjustable slide 6 provided with a hand-wheel for raising and lowering the said slide in a bracket or sleeve 5 attached to the front face of the standard 1.

The front face of section 1' of the standard is provided with spaced vertical guides 16 coöperatively engaged by a slide 10, to the lower face of which is secured a conductor plate 14, which is insulated from the slide 10, and to the outer face of which is attached a clamp 11, for the upper electrode 12, which latter is secured to the clamp by means of a set screw 13. Preferably, the clamps 4 and 11 and their associated holding plates are provided with ducts or passageways 15' and 15, respectively, indicated in dotted lines in Fig. 1, to permit water or other cooling medium to be circulated through the parts thereof. Mounted in the bearing bracket or sleeve 19 on the upper part of the slide 10 is an adjustable spindle 18, the lower end 17 of which projects within the opening formed by a cutaway portion in the slide 10 to engage a cam 23 carried by the outer end of the shaft 20, journaled in the upper part of the standard, the rotation of the shaft causing the cam 23 to intermittently engage the projecting end 17 of the spindle 18 and thereby lift the slide 10 and its associated electrode 12 from the work. When the low part of the cam 23 engages the end 17 of the spindle 18, the slide 10 is lowered to bring the upper electrode 12 in contact with the work, where it remains until the high section of the cam again lifts the slide. By adjusting the spindle 18, the height of the lower end of electrode 12 above the table may be accurately regulated to accommodate work of varying thickness.

Loosely journaled on the rear end of the shaft 20 is a driving pulley 24 connected by a belt 50 with the pulley 51 mounted upon a shaft 52 journaled on the lower part of the standard 1, which shaft is in turn driven by a motor 53 or other suitable means. The belt pulley 24 is adapted to be intermittently clutched to the shaft 20 to impart a single rotation thereto during the formation of a single weld by the following mechanism: Splined to the shaft 20 is a sleeve 27 provided with a longitudinal recess 27' in which is mounted a sliding bolt 28 acted upon by a helical spring 29 tending to force the bolt outward. The enlarged head of the bolt is provided with a beveled nose 30 adapted to coöperate with a correspondingly beveled recess 26 formed in the hub of the pulley 24. The opposite end of the bolt 28 is provided with an offset beveled nose 31 adapted to engage with a beveled recess 32 formed in the outer face of the journal plate 21. In the head of the bolt 28 is secured a pin 33 which extends through a slot in the sleeve 27, which pin is adapted to coöperate with a cam lug 36 formed on the under face of a curved lever 34 pivoted in a bracket 35 secured to the standard 1, said lever being adapted to be raised and lowered by means of a finger 38 secured to the free end of the lever and operating in a fixed guide 39, said finger being raised and lowered by a rod 40, secured thereto, which rod is connected to the end of a foot lever or treadle 41 pivoted to the base of the standard 1. The normal tendency of the bolt 28 is to lock or clutch the pulley 24 to the shaft 20 when the nose 30 of the bolt is in alinement with the recess 26 in the hub of the pulley. When, however, the lever 34 is in lowered position, the cam lug 36 thereon engages the pin 33 and forces the bolt 28 against the tension of its spring 29 out of engagement with the hub of the pulley and into locking engagement with the recess 32 in the journal plate 21 fixed to the standard, so that the rotation of the shaft 20 is prevented and the parts are held in locked position with the upper electrode 12 completely withdrawn from the work. When the operator depresses the treadle 41, rod 40 and finger 38 are elevated to lift the curved lever 34, so that the cam lug 36 is raised above pin 33 and the spring 29 of bolt 28 forces the latter forward so that as soon as the recess 26 in the hub 25 of pulley 24 comes in alinement with the bolt, the nose 30 of said bolt engages the recess 26 and locks the pulley 24 to sleeve 27 and shaft 20. As soon as this locking action is effected, the operator removes his foot from the treadle 41, which allows the lever 34 to descend so that the lug 36 thereon is in position to engage the pin 33 of bolt 28 just before a single rotation of the shaft is completed, thereby disengaging the bolt 28 for engagement with the hub of the pulley and causing the opposite end 31 of the bolt to engage the recess 32 in the journal plate 21 and lock the shaft against further movement.

Within the base of the standard 1, is mounted a transformer of the usual type employed in electric welding consisting of a core 60, a primary winding 61 adapted to be connected with the current leads, and a secondary winding 62 which consists of a few turns of heavy copper bars or other suitable conductors, the respective ends of which are connected by couplings 62' and 62'' to the plates 14 and 4' of the clamps for the electrodes 12 and 8.

In order to accurately adjust and regulate the duration of the application of the welding current at the electrodes and to entirely eliminate the personal judgment of the operator, to prevent the overheating or burning of the work, to increase the speed of operation and to effect a regular series of uniform and homogeneous welds by successive automatic operations of the machine, the following adjustable timing apparatus is provided to close the primary circuit of the transformer and to interrupt the same the instant the individual weld has been completed. Secured to the shaft 20 is a fixed sleeve of insulating material 70 having on one face a conductor ring 72 provided with a wing or segment 74 embedded in and extending over a portion of the periphery of the sleeve 70. Loosely mounted upon the shaft 20 is a metal sleeve 76 to which is secured a second sleeve of insulation 71 having a conductor ring 73 on one face thereof adapted to form a continuous and efficient electrical contact with the ring 72 on sleeve 70. Said ring 73 has a similar conductor segment 75 overlying a part of the peripheral edge of sleeve 71. A portion of the shaft to the rear of the sleeve 76 is screw-threaded and adapted to receive an internally threaded hand-wheel 77 by means of which the sleeve 76 and its attached commutator sleeve 71 is forced into close engagement with the coöperating commutator sleeve 70 so that the two sleeves 70 and 71 rotate in unison with the shaft. When the hand-wheel 77 is slacked off, the sleeve 71 may be adjusted circumferentially with respect to sleeve 70, so as to bring the conductor segments 74 and 75 of the respective sleeves into any desired degree or extent of overlapping alinement. Engaging the peripheries of the commutator sleeves 70 and 71 respectively, are two brushes 80 and 81, which are mounted in the outer ends of levers 82 and 83, pivoted upon the short shaft 84, journaled in brackets in the upper part 1' of the standard, which brushes are connected by any suitable means in one of the leads from the main circuit supplying the transformer and serve to complete the circuit through the transformer for a predetermined length of time dependent upon the extent of overlapping registry of the conductor segments 74 and 75 carried by the respective commutator sleeves. From the foregoing, it will be apparent that as the shaft, carrying the commutator sleeves 70 and 71 with their associated conductor rings 72 and 73 and conductor segments 74 and 75, rotates, the current will flow from one brush 80 through commutator segments 74, contact ring 72 to contact ring 73, thence to commutator segment 75 to brush 81, and the duration of the current will depend upon the relative adjustment of the two sleeves 70 and 71. When the said sleeves are so adjusted that the segments 74 and 75 lie in axial alinement with each other, the current will flow for a period of time necessary for the entire length of both segments 74 and 75 to pass under the respective brushes. When, however, the sleeve 71 is adjusted so as to cause a portion only of its segment 75 to overlap segment 74, the duration of the current will correspond only to the extent of the overlapping of the segments for the reason that at all other times during the complete rotation of the shaft one or both of the brushes 80 and 81 will engage the insulated portion of the periphery of the corresponding commutator sleeves 70 and 71. The extent of the overlapping of the segments 74 and 75 is accurately adjusted in accordance with the time required to perfect a single weld between the electrodes and its adjustment made by backing off the hand-wheel 77 and turning the commutator sleeve 71 axially about the shaft 20 until the desired adjustment of the segments is effected, when the hand-wheel 77 is again set up to force sleeve 76 along the shaft and clamp sleeves 70 and 71 securely together with their conductor rings 72 and 73 in intimate electrical contact.

In order to prevent injurious sparking between the brushes 80 and 81 and the commutator segments 74 and 75 respectively, an auxiliary carbon contact break is located in a shunt thrown around the brushes 80 and 81 and the rotary contacts associated therewith. This auxiliary break or interrupter is adapted to be operated just after the brushes 80 and 81 pass out of engagement with their coöperating conductor segments 74 and 75, so that the heavy sparking due to the breaking current will be taken up by the carbon contacts of said auxiliary interrupter. The proper operation of the auxiliary interrupter is effected by the following instrumentalities. Formed on the sleeve 76, which is connected to the commutator sleeve 71, is a cam 90 in coöperative engagement with lever 91 pivoted at 92 within the upper part of the standard 1, and having at its middle portion a roller 93 held in engagement with the periphery of the cam 90 by a helical spring 90'. The outer end of the lever 91 is forked and each end of the fork engages one of two pivoted pawls or dogs 98 connected by brackets 98' to the sides of the sliding tube 94 mounted in vertical guides 95 and 97 secured to an inner wall or partition 110 within the base or standard. The upper guide 95 is formed as a dash-pot within which operates a piston 96 secured to the sleeve 94 and which serves to check any sudden or violent movement of the sleeve. Slidably mounted within the sleeve 94 is a rod 99 provided throughout its upper portion with rack teeth 100 adapted to be engaged by the ends of the pivoted pawls 98 which extend through lateral slots in the sleeve 94. To the lower end of the rod 99 is secured a cross head 101 provided at each end with socket clamps 102 in which are secured carbon rods 103. The cross head 101 is insulated from the rod 99. Coöperating with the carbon rods 103 and their connecting conductor formed by the cross head 101 are two carbon rods 109 mounted in vertical alinement with the rods 103 upon the bottom of the compartment formed by wall 110. Each of said rods 109 is clamped in a sleeve 106 slidably mounted in tubular brackets 105 secured to the wall 110, each of said sleeves being provided at its lower portion with a cushioning spring 107 which rests upon a section of insulation 111 in the bottom of the compartment formed by wall 110. The operation of this shunt auxiliary interrupter is as follows: After the brushes 80 and 81 have engaged the conductor segments 74 and 75 and closed the circuit through the primary of the transformer, the further rotation of shaft 20 brings the high part of cam 90 into engagement with pivoted lever 91 and forces the latter downward against the tension of its retractoral spring 90'. This has the effect of rocking dogs 98 out of engagement with the racks 100 on opposite sides of the rod 99, thereby permitting the rod to drop and the upper carbons 103 to engage the lower carbons 109 and close the shunt about the timing device just before the highest part of said cam 90 engages said lever 91 and therefore just before the brushes 80 and 81 pass out of engagement with the conductor segments 74 and 75. At a short interval of time after the brushes 80 and 81 have left the segments 74 and 75, the high part of cam 90 passes out of engagement with the roller 93 on lever 91 and said lever is pulled back to its normal retracted position by its spring 90'. The upward movement of the lever 91 rocks the dogs 98 to throw the ends thereof into engagement with the racks 100, thereby lifting the rod and withdrawing carbons 103 from engagement with carbons 109 and breaking the primary circuit finally at these carbon points which are not seriously affected by the sparking produced by the breaking of the current. The application of the dogs 98 and the racks 100 on the rod 99 permits the stroke of the rod to be adjusted to compensate for any wearing away of the carbon contacts and insures an absolute and effective engagement of the upper movable carbon rods with the lower spring cushioned carbon rods, irrespective of the extent of movement of the lever 91, for as soon as the rod 99 is released it drops by gravity until the two sets of carbons engage each other. Any irregularity in the lengths of the several carbons is compensated by the yielding support of the lower rods 109 which give under the weight of the rod 99 and its appurtenant parts and maintain both sets of carbon contacts in intimate engagement. The provision of the racks 100 on the bar 99 insures a proper stroke or movement of the attached rods or carbons 103 to separate the latter from the lower carbons irrespective of the length of the upper carbons extending beyond the cross head 101. The provision of the piston 96 attached to the sleeve 94 and operating in the dash-pot 95 insures a gradual withdrawal of the sleeve 94, rod 99 and carbons 103 and cushions the return movement against the sudden shock which the retractoral spring 90' would impart thereto if no such device were employed.

The circuits involved in the apparatus as described are diagrammatically illustrated in Fig. 9, in which $a$ and $b$ represent the leads from the supply line which are connected to the local circuit by means of a suitable switch or cut-out $x$. Beyond the switch, wire $f$ leads to brush 80; brush 81 is connected by leads $e$ and $d$ with one end of the primary of the transformer. A shunt circuit consisting of wires $g$ and $h$ is connected to wires $f$ and $e$ respectively, said shunt circuit containing the carbon contacts 109 which coöperate with the movable carbon contacts 103 supported by cross head 101, as hereinbefore explained. The other main lead $a$ is connected beyond the switch by a wire $c$ with a distributing switch consisting of a rotary contact $s$ and four stationary contacts $s^1$, $s^2$, $s^3$, $s^4$, each of which contacts is connected with a section of the primary winding of the transformer, so that as the rotary contact is brought into engagement with a given stationary contact $s^1$, $s^2$, etc., the circuit is closed through a greater or less number of turns of the primary winding of the transformer 60. The secondary winding indicated at 62 is, as hereinbefore explained, connected at its ends with the stationary welding electrode 8 and the coöperating movable electrode 12.

The operation of the apparatus is described as follows: The work to be welded is placed upon the table 4 and adjusted so that the portions thereof to be subjected to the welding operation are brought between the welding electrodes 8 and 12. The operator then depresses treadle 41 which lifts lever 34 out of engagement with pin 33 carried by bolt 28 which releases said bolt, permitting the spring 29 thereof to force the nose 30 into engagement with the recess 26' in the hub 25 of the continuously rotating flywheel 24, thereby coupling said fly-wheel to the shaft 20. As soon as this coupling is effected, the operator removes his foot from the treadle and the lever 34 drops to its normal position with its lug 36 in the path of rotary movement of the pin 33, which partakes of the rotation of fly-wheel 24 and shaft 20, as will be understood. The first part of the rotation of shaft 20 causes the high part of the cam 23 to pass out of engagement with the spindle 18 on slide 10 and allows the slide to drop by gravity until the upper electrode 12 is pressed firmly into engagement with the upper surface of the work. The further rotation of the shaft brings the conductor segments 74 and 75 in contact with brushes 80 and 81 respectively, thereby closing the circuit to the primary 60 of the transformer as follows: lead $a$, a one arm switch $x$, wire $c$, rotary contact $s$ to one of the stationary contacts $s^1$, $s^2$, $s^3$, $s^4$ of the transformer, according to the current desired, thence through the particular section or sections of the primary winding through wires $d$ and $e$ to brush 81, conductor segments 75, conductor ring 70, thence to conductor ring 72 and segment 74, thence to brush 80, wire $f$ and the other arm of switch $x$ to lead $b$. It will be apparent that the time in which this current flow is permitted will be dependent upon the relative angular adjustment of the two conductor segments 74 and 75 and, of course, the speed of rotation of the shaft 20. Assuming the shaft to rotate at the uniform speed, the duration of the current can be accurately timed to a fraction of a second by adjusting the sleeve 70 angularly about the shaft 20 to cause the conductor segments 74 and 75 to overlap to a greater or less extent. When the segments 74 and 75 completely overlap and are in axial alinement, the maximum period of contact will occur. When, however, the segments are caused to move out of axial alinement and to overlap less and less, the periods of duration of the current flow will be less and less and can thereby be accurately adjusted to the requirements of the individual welds. It will be understood, of course, that the adjustment of the rotary switch involving the relatively movable contacts 74 and 75 will be effected in the first instance by a skilled operator to meet the requirements of the particular work to be welded and when once so adjusted, the machine may then be operated by ordinary unskilled labor with the assurance that each welding operation will be effected by just the proper amount of current to accomplish the result. As soon as commutator segment 75 passes out of engagement with its coöperating brush 81, the circuit is broken at the timing switch, but before this breaking occurs, the auxiliary carbon contacts are brought into engagement, as hereinbefore explained, to shunt the heavy current around the timing switch and thereby eliminate sparking between the brush and the commutator segment immediately after which the shunt circuit is broken between carbons 103 and 109 by the lifting of the rod 99, as hereinbefore explained, thereby completely interrupting the circuit through the primary of the transformer and stopping the induced current in the secondary of said transformer. It will be noted that the cam 90 which controls the operation of the auxiliary break is adjusted simultaneously with the commutator sleeve 71, so that the breaking of the circuit at the auxiliary contacts takes place immediately after the breaking of the current between the commutator segment 75 and brush 81. As the shaft 20 continues its rotary movement, the pin 33 on locking bolt 28 engages cam 36 on lever 34 which serves to force the said pin backward against the tension of its spring 29, thereby releasing the sleeve 27 and shaft 20 from their locked engagement with fly-wheel 24, and the opposite end of the bolt 28 engaging in recess 32 of the journal plate 21 arrests the movement of the shaft. The final movement of the shaft also brings the cam 23 into position to lift the slide 10 and withdraw movable contact 12 from engagement with the work. The several parts remain in this relation until the work is shifted to position for another weld when the operator again depresses the treadle 41 and the series of operations just described is repeated.

Obviously, instead of making the operation of the machine dependent upon the actuation of the treadle 41, by the operator, automatic means for effecting the engagement and disengagement of the clutch bolt 28 may be provided, but under ordinary conditions, it would be both safe and expedient to provide the machine with the means described under control of the operator for effecting the successive welding operations which, however, will not leave to the judgment or discretion of the operator the actual timing of the successive welds, which is controlled and regulated by the automatic timing switch as described.

What I claim is:—

1. Electric welding apparatus, comprising welding electrodes relatively movable toward and from each other, mechanical means for effecting the movement aforesaid, and relatively adjustable contacts operated by said means for regulating the duration of the welding current.

2. Electric welding apparatus, comprising welding electrodes, mechanical means including a rotary shaft for moving said electrodes relatively toward and from each other, and relatively adjustable contacts operated by said shaft for regulating the duration of the welding current.

3. Electric welding apparatus, comprising a transformer, a work table carrying a fixed electrode, a movable head carrying a coöperating electrode, a rotary shaft operating said head, and relatively adjustable contacts in the transformer circuit and operated by said shaft to regulate the duration of the current flowing through said electrodes.

4. Electric welding apparatus, comprising a transformer, a work table carrying a fixed electrode, a movable head carrying a coöperating electrode, a rotary shaft operating said head, and relatively adjustable contacts in the primary circuit of the transformer and operated by said shaft to regulate the duration of the current flowing through said electrodes.

5. Electric welding apparatus, comprising relatively movable welding electrodes, mechanism for effecting the relative movement of said electrodes, and an adjustable timing switch operated by said mechanism whereby the duration of the welding current through the electrodes is determined.

6. Electric welding apparatus, comprising relatively movable welding electrodes, a power shaft for effecting the relative movement of said electrodes, and an adjustable timing switch operatively connected to said shaft to regulate the duration of the current flowing through said electrodes.

7. Electric welding apparatus, comprising relatively movable welding electrodes, a power shaft for effecting the relative movement of said electrodes, an adjustable timing switch operatively connected to said shaft to regulate the duration of the current flowing through said electrodes, and an auxiliary switch operated by said shaft to prevent sparking at the timing switch.

8. Electric welding apparatus, comprising welding electrodes relatively movable toward and from each other, a power shaft for effecting the relative movement of said electrodes, an adjustable timing switch operatively connected to said shaft to regulate the duration of the current flowing through said electrodes, and means for periodically operating said shaft.

9. Electric welding apparatus, comprising a work holding table, relatively movable welding electrodes coöperating therewith, a rotary shaft for effecting the relative movement of said electrodes, an adjustable timing switch operatively connected with said shaft, and means for intermittently coupling said shaft with a source of power.

10. Electric welding apparatus, comprising a standard, a work holding table mounted thereon, a welding electrode associated with said table, a sliding head carried by said standard, a welding electrode mounted on said sliding head and coöperating with the electrode aforesaid, a rotary shaft coöperating with said sliding head, an adjustable timing switch operatively connected with said shaft, and means for intermittently coupling said shaft with a driving mechanism.

11. Electric welding apparatus, comprising a standard, a work holding table mounted thereon, a welding electrode associated with said table, a sliding head carried by said standard, a welding electrode mounted on said sliding head and coöperating with the electrode aforesaid, a rotary shaft coöperating with said sliding head, an adjustable timing switch operatively connected with said shaft, a clutch for coupling said shaft to a driving means, and means for operating said clutch.

12. Electric welding apparatus, comprising a standard having a work table thereon, a fixed electrode, a relatively movable electrode coöperating therewith, a sliding head carrying the movable electrode, a rotary shaft operating said head, a switch member mounted on said shaft including relatively adjustable contact sections, contact brushes coöperating with said switch member, and means for intermittently rotating said shaft.

13. Electric welding apparatus, comprising relatively movable welding electrodes, a rotary shaft for effecting such relative movement of the electrodes, and a timing switch associated with said shaft comprising insulating sleeves on said shaft, conductor segments on said sleeves, means for relatively adjusting said sleeves to fix the relative positions of said segments, and contact brushes coöperating with said sleeves and segments.

In testimony whereof I affix my signature, in presence of two witnesses.

JOHN ALLEN HEANY.

Witnesses:
 FRED. B. McLAREN,
 MARGARET E. HILLMAN.